US012573148B2

(12) United States Patent     (10) Patent No.:     US 12,573,148 B2
Liu et al.     (45) Date of Patent:     Mar. 10, 2026

(54) IMAGE RENDERING METHOD, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Xing Liu, Beijing (CN); Ruizhi Chen, Beijing (CN); Yan Zhang, Beijing (CN); Chen Zhao, Beijing (CN); Hao Sun, Beijing (CN); Jingtuo Liu, Beijing (CN); Errui Ding, Beijing (CN); Tian Wu, Beijing (CN); Haifeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 252 days.

(21) Appl. No.: 18/185,359

(22) Filed: Mar. 16, 2023

(65) Prior Publication Data

US 2023/0419610 A1     Dec. 28, 2023

(30) Foreign Application Priority Data

Jun. 24, 2022     (CN) .......................... 202210721378.5

(51) Int. Cl.
*G06T 17/20*     (2006.01)
*G06T 5/50*     (2006.01)
(Continued)

(52) U.S. Cl.
CPC ............... *G06T 17/20* (2013.01); *G06T 5/50* (2013.01); *G06V 10/26* (2022.01); *G06V 10/60* (2022.01);
(Continued)

(58) Field of Classification Search
CPC . G06T 17/20; G06T 5/50; G06T 2207/10028; G06T 2207/20221; G06V 10/60; G06V 10/26
See application file for complete search history.

(56) References Cited

U.S. PATENT DOCUMENTS

2019/0020843 A1     1/2019   Reif
2021/0166467 A1 *   6/2021   Zhang ................... G06T 15/503
(Continued)

FOREIGN PATENT DOCUMENTS

CN     111145341 A     5/2020
CN     113206971 A     8/2021
(Continued)

OTHER PUBLICATIONS

Machine Translation of CN-114119849-A (Year: 2022).*
(Continued)

*Primary Examiner* — Kee M Tung
*Assistant Examiner* — Xiaoming Wei
(74) *Attorney, Agent, or Firm* — Hunton Andrews Kurth LLP

(57)     ABSTRACT

An image rendering method includes the steps below. A model of an environmental object is rendered to obtain an image of the environmental object in a target perspective. An image of a target object in the target perspective and a model of the target object are determined according to a neural radiance field of the target object. The image of the target object is fused and rendered into the image of the environmental object according to the model of the target object.

9 Claims, 5 Drawing Sheets

(51) Int. Cl.
  *G06V 10/26*    (2022.01)
  *G06V 10/60*    (2022.01)

(52) U.S. Cl.
  CPC ............... *G06T 2207/10028* (2013.01); *G06T*
            *2207/20221* (2013.01)

(56)       References Cited

U.S. PATENT DOCUMENTS

| | | | |
|---|---|---|---|
| 2023/0281913 A1* | 9/2023 | Rematas | ................... G06T 7/55 |
| | | | 345/419 |
| 2023/0298243 A1* | 9/2023 | Nagano | ................... G06T 13/40 |
| | | | 345/473 |
| 2024/0013479 A1* | 1/2024 | Wu | ......................... G06T 15/55 |

FOREIGN PATENT DOCUMENTS

| | | | |
|---|---|---|---|
| CN | 113240692 A | 8/2021 | |
| CN | 113706714 A | 11/2021 | |
| CN | 114119849 A | * 3/2022 | ........... G06T 15/506 |

OTHER PUBLICATIONS

Jordan Santell, "Model View Projection", Apr. 14, 2019 (Year: 2019).*
Li et al. machine translation of CN-114119849-A (Year: 2022).*
https://math.hws.edu/graphicsbook/c7/s2.html Section 7.2 Lighting and Material (Year: 2016).*
First Chinese Office Action, from The State Intellectual Property Office of People's Republic of China, issued to CN Application No. 202210721378.5, Aug. 8, 2022, 4 pages.
Second Chinese Office Action, from The State Intellectual Property Office of People's Republic of China, issued to CN Application No. 202210721378.5, Aug. 31, 2022, 9 pages.
Zhao et al., "Luminance and Depth Based Real-time Depth of Field Rendering Algorithm," Journal of System Simulation, vol. 24, No. 8, Aug. 2012, pp. 1612 to 1617.

* cited by examiner

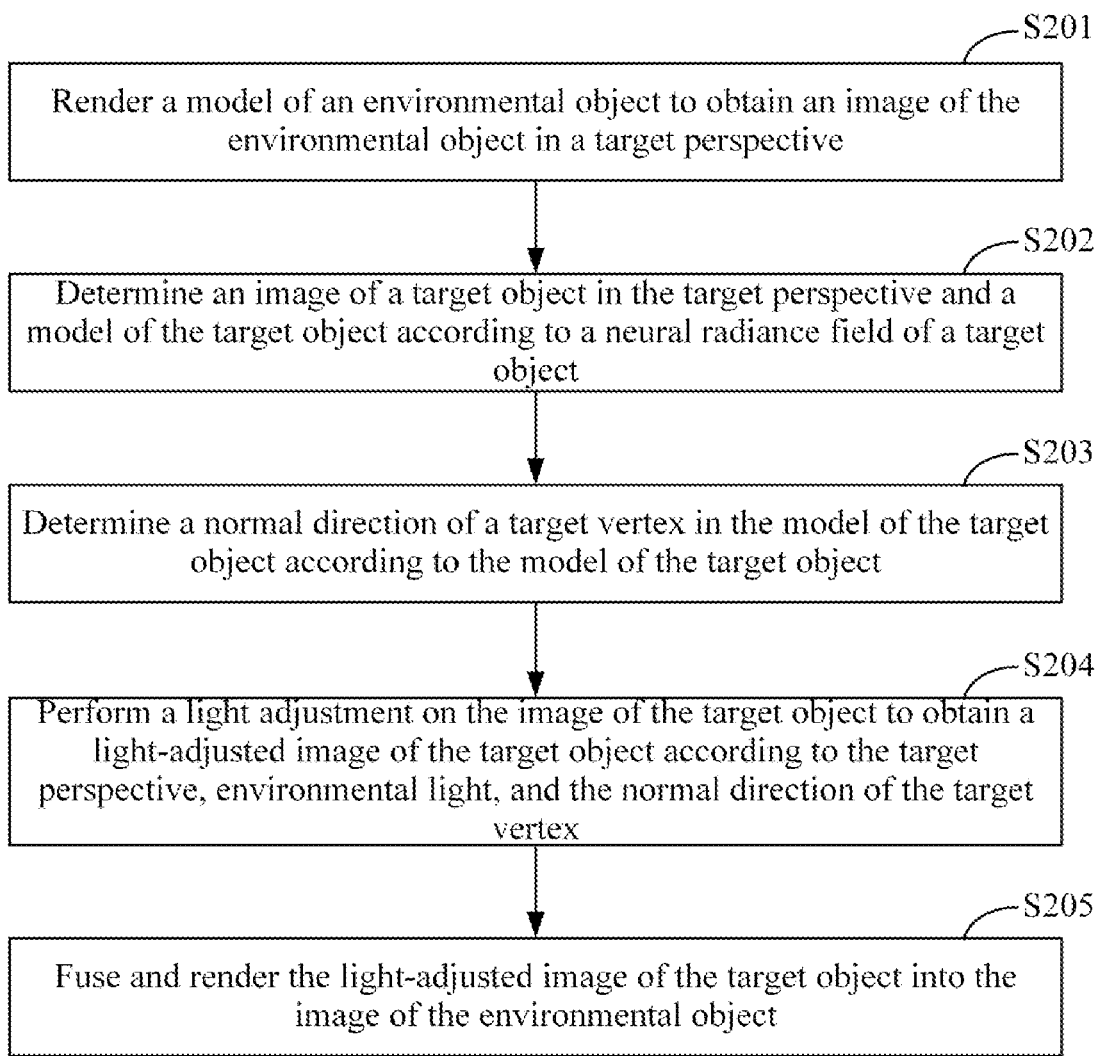

S201

Render a model of an environmental object to obtain an image of the environmental object in a target perspective

S202

Determine an image of a target object in the target perspective and a model of the target object according to a neural radiance field of a target object

S203

Determine a normal direction of a target vertex in the model of the target object according to the model of the target object

S204

Perform a light adjustment on the image of the target object to obtain a light-adjusted image of the target object according to the target perspective, environmental light, and the normal direction of the target vertex

S205

Fuse and render the light-adjusted image of the target object into the image of the environmental object

FIG. 2

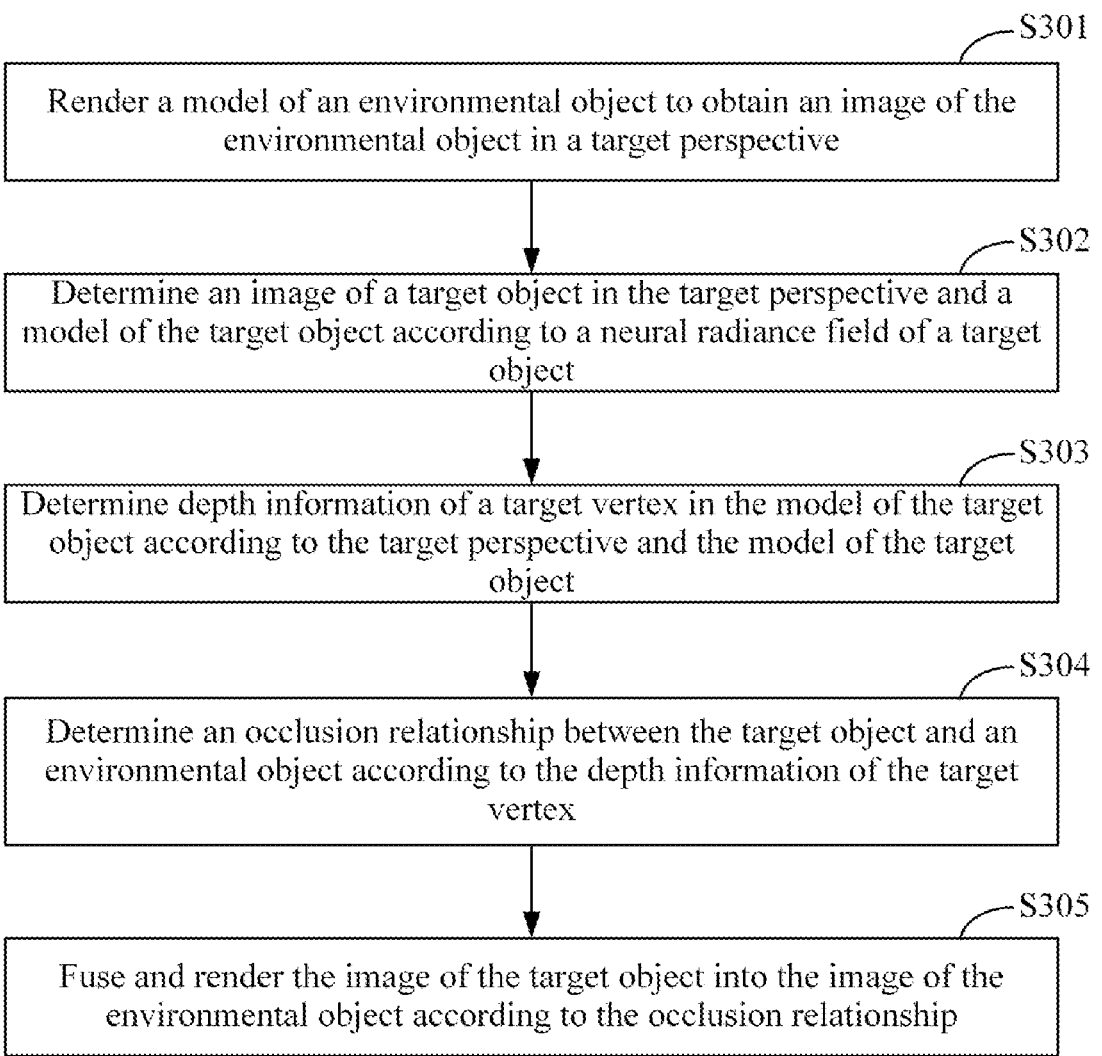

S301

Render a model of an environmental object to obtain an image of the environmental object in a target perspective

S302

Determine an image of a target object in the target perspective and a model of the target object according to a neural radiance field of a target object

S303

Determine depth information of a target vertex in the model of the target object according to the target perspective and the model of the target object

S304

Determine an occlusion relationship between the target object and an environmental object according to the depth information of the target vertex

S305

Fuse and render the image of the target object into the image of the environmental object according to the occlusion relationship

FIG. 3A

IMAGE RENDERING METHOD, ELECTRONIC DEVICE, AND STORAGE MEDIUM

CROSS-REFERENCE TO RELATED APPLICATION(S)

This application claims priority to Chinese Patent Application No. 202210721378.5 filed Jun. 24, 2022, the disclosure of which is incorporated herein by reference in its entirety.

TECHNICAL FIELD

The present disclosure relates to the field of computers and, in particular, to the field of artificial intelligence technology specifically including augmented reality (AR), virtual reality (VR), computer vision, and deep learning, and can be applied to scenarios such as an avatar and a metaverse, for example, an image rendering method and apparatus, an electronic device, and a storage medium.

BACKGROUND

Computer graphics (CG) is a science that uses a mathematical algorithm to transform a two-dimensional or three-dimensional graphic into a mesh form of a computer display. A CG rendering pipeline is an independent parallel processing unit for processing graphic signals inside a display chip and is used for transforming an object model in three-dimensional space into an object image in a two-dimensional plane.

SUMMARY

The present disclosure provides an image rendering method and apparatus, an electronic device, and a storage medium.

According to one aspect of the present disclosure, an image rendering method is provided. The method includes the steps below.

A model of an environmental object is rendered to obtain an image of the environmental object in a target perspective.

An image of a target object in the target perspective and a model of the target object are determined according to a neural radiance field of the target object.

The image of the target object is fused and rendered into the image of the environmental object according to the model of the target object.

According to another aspect of the present disclosure, an electronic device is provided.

The electronic device includes at least one processor; and a memory communicatively connected to the at least one processor.

The memory stores instructions executable by the at least one processor. The instructions are executed by the at least one processor to cause the at least one processor to execute the image rendering method provided in any embodiment of the present disclosure.

According to another aspect of the present disclosure, a non-transitory computer-readable storage medium storing computer instructions is provided. The computer instructions are configured to cause a computer to execute the image rendering method provided in any embodiment of the present disclosure.

It is to be understood that the content described in this part is neither intended to identify key or important features of the embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the solutions and not to limit the present disclosure. In the drawings:

FIG. 2 is a flowchart of another image rendering method according to an embodiment of the present disclosure.

FIG. 3A is a flowchart of another image rendering method according to an embodiment of the present disclosure.

DETAILED DESCRIPTION

Figure 1A:
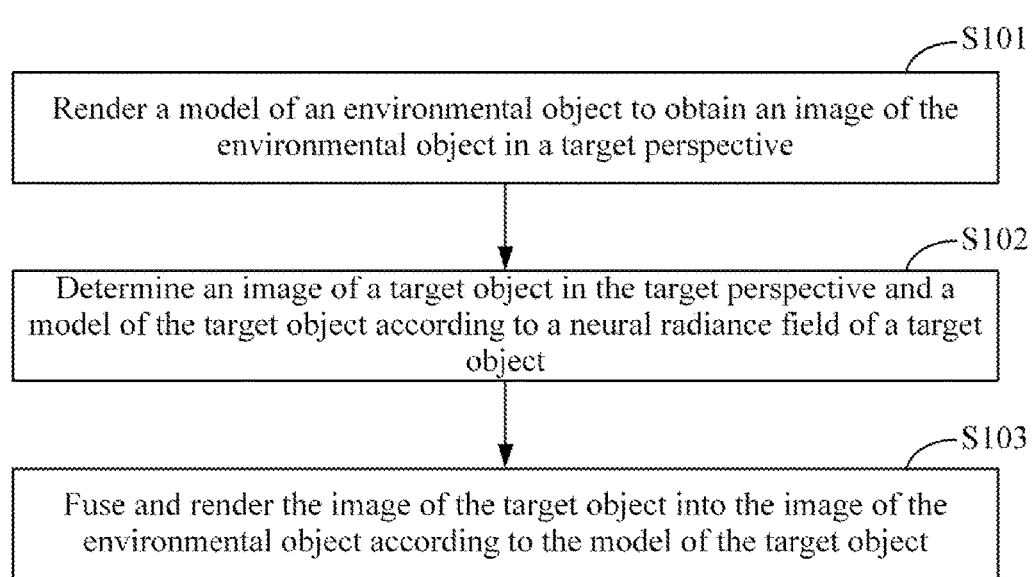
FIG. 1A is a flowchart of an image rendering method according to an embodiment of the present disclosure.

FIG. 1A is a flowchart of an image rendering method according to an embodiment of the present disclosure. The method is applicable to the case where a neural rendering result is applied to a CG rendering pipeline. The method may be executed by an image rendering apparatus. The apparatus may be implemented by software and/or hardware. As shown in FIG. 1A, the image rendering method in this embodiment may include the steps below.

In step S101, a model of an environmental object is rendered to obtain an image of the environmental object in a target perspective.

In step S102, an image of a target object in the target perspective and a model of the target object are determined according to a neural radiance field of the target object.

In step S103, the image of the target object is fused and rendered into the image of the environmental object according to the model of the target object.

The model of the environmental object refers to a three-dimensional model of an environmental object and may be obtained by modeling the environmental object by three-dimensional modeling software. The three-dimensional modeling software is not specifically limited in the embodiment of the present disclosure and may be, for example, a Unity three-dimensional (3D) model. Moreover, the environmental object is not specifically limited in the embodiment of the present disclosure.

Figure 1B:
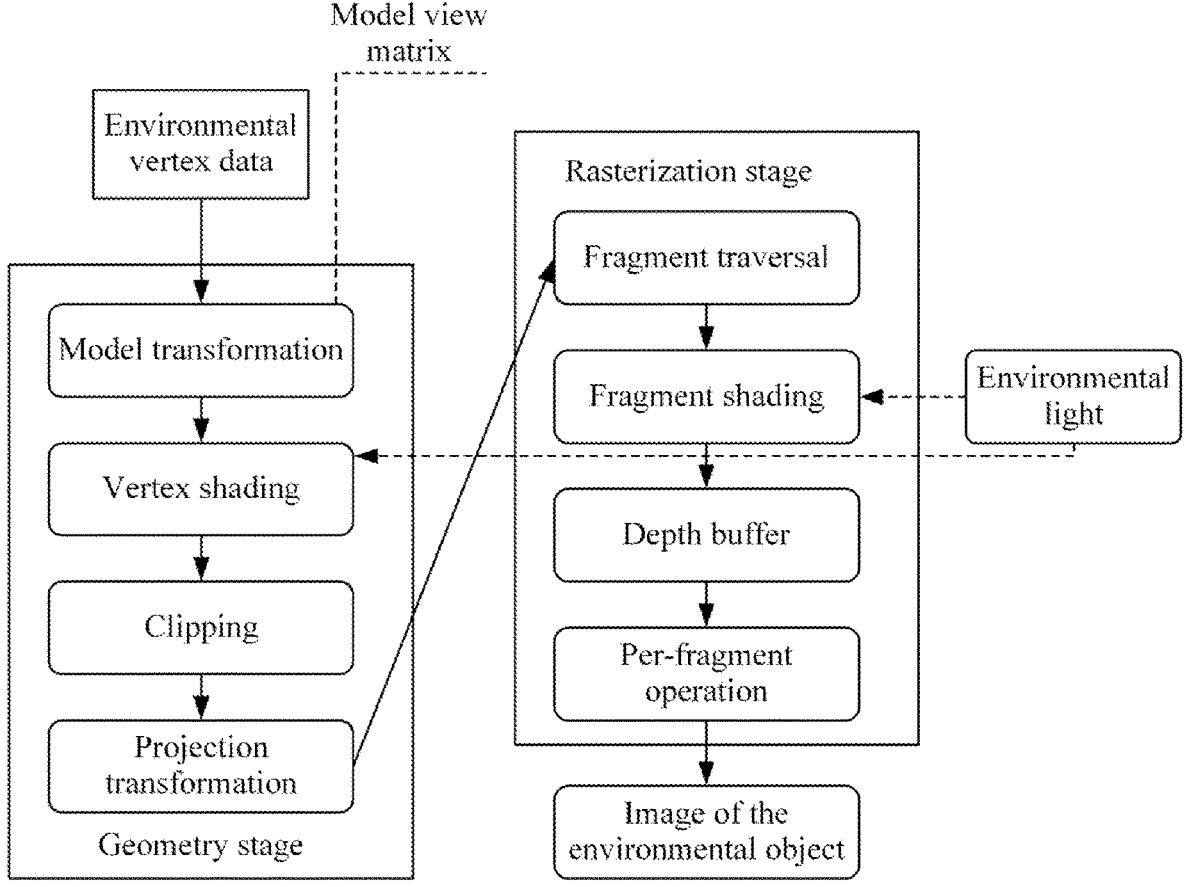
FIG. 1B is a schematic diagram of a CG rendering pipeline in the related art.

In the embodiment of the present disclosure, the CG rendering pipeline renders the model of the environmental object to obtain the image of the environmental object in the target perspective. Referring to FIG. 1B, the CG rendering pipeline uses environmental vertex data in the model of the environmental object as input, through a geometry stage including a model transformation, a vertex shading, a clipping, and a projection transformation, and a rasterization stage including a fragment traversal, a fragment shading, depth buffer writing, and a per-fragment operation, to obtain the image of the environmental object in the target perspective as a rendering result of the environmental object.

In the embodiment of the present disclosure, the neural radiance field of the target object may be pre-trained according to an image of the target object and an acquisition perspective of the image. Input of the neural radiance field may be the spatial position of the target object and the acquisition perspective of the image. The color of the image is trained as a network truth value. The neural radiance field may output a volume density (i.e., transparency) and a spatial point color of the target object. Exemplarily, a multi-layer perception (MLP) and a volume rendering are used for fitting and reconstructing the geometry and the appearance of the target object from the image of the target object. The image of the target object may be obtained by acquiring the target object.

The model of the target object is a three-dimensional model of the target object and may be acquired from the neural radiance field of the target object. The image of the target object is a two-dimensional image of the target object. The target perspective may be used as the input of the neural radiance field of the target object to obtain the image of the target object in the target perspective. The image of the target object and the image of the environmental object have the same size. Exemplarily, a rendering parameter of the target object in the target perspective may be determined by using the model of the target object and used for fusing and rendering the image of the target object into the image of the environmental object so that a fused and rendered image including the target object and the environmental object is obtained. The rendering parameter may be an intensity or depth information of the target vertex in the target object. Correspondingly, the intensity or the depth information of the target vertex in the target object may be used for fusing and rendering the image of the target object into the image of the environmental object. That is, the image of the target object and the image of the environmental object are mapped so that the fused and rendered image includes both the target object and the environmental object.

The model of the target object and the image of the target object in the target perspective are determined by the neural radiance field of the target object so that not only the problems of high costs and unrealistic results of three-dimensional model reconstruction and visualization pipeline can be solved, but also the neural radiance field characterized by low cost, high stability, and high quality can be fully utilized for obtaining the image of the target object of high precision. Moreover, the rendering parameter of the target object in the target perspective is determined according to the model of the target object and used for fusing and rendering the image of the target object into the image of the environmental object so that the rendering consistency between the image of the target object and the image of the environmental object can be improved, and thus the rendering quality of the fused and rendered image can be improved.

In the solutions provided by the embodiment of the present disclosure, the model of the target object and the image of the target object in the target perspective are determined according to the neural radiance field of the target object, and the rendering parameter of the target object in the target perspective is determined according to the model of the target object and is used for fusing and rendering the image of the target object into the image of the environmental object so that the neural radiance field of the target object is applied to the CG rendering pipeline, the CG rendering pipeline can fully utilize the neural radiance field characterized by low cost, high stability, and high quality, the rendering consistency between the image of the target object and the image of the environmental object can be improved, and thus the rendering quality of the fused and rendered image can be improved.

The environmental vertex data may include a coordinate, a color, a normal line, and a texture coordinate of an environmental vertex. Referring to FIG. 1B, in the process of model transformation, a model view matrix in the target perspective is determined. The coordinate of the environmental vertex pre-multiplies the model view matrix in the target perspective so that the environmental vertex is mapped to a view frustum space in the target perspective. Objects in the view frustum space are all observed by a camera at the target perspective. The position of the environmental object in the view frustum space can be accurately controlled by adjusting the target perspective. The model view matrix in the target perspective may be obtained by performing an inverse transformation on a view matrix in the target perspective and multiplying a model matrix. The model matrix is a transformation matrix from a model coordinate system to a world coordinate system. The view matrix in the target perspective is a transformation matrix from the world coordinate system to a camera coordinate system in the target perspective. In this manner, the camera coordinate system in the target perspective can be moved to the origin of the world coordinate system by the inverse transformation of the view matrix.

Referring to FIG. 1B, in the process of vertex shading, the color of the environmental vertex is determined according to a vertex normal direction and environment light of the environmental vertex. The vertex normal direction of the environmental vertex may be input to the CG rendering pipeline as known information. For example, an outer product of two sides of a triangle to which the environmental vertex belongs is calculated so that the vertex normal direction of the environmental vertex is obtained, and vertex normal directions of environmental vertexes in the triangle are averaged as a normal direction of the triangle. The environment light may be provided by an environmental map and a light source of a CG rendering engine.

In the process of clipping, the environmental vertex located outside the view frustum space in the target perspective is deleted. After the deletion, the boundary of the target object is smoothed. In the process of projection transformation, the clipped and colored environmental vertex pre-multiplies a camera projection matrix in the target perspective so that the environmental object is projected onto the imaging plane of the camera, making the environmental object conform to the human visual characteristic of foreshortening effects. The camera projection matrix is determined according to the view frustum space in the target perspective, i.e., determined according to the upper plane, the lower plane, the left plane, the right plane, the far plane, and the near plane of the view frustum space.

Referring to FIG. 1B, in the rasterization stage, the environmental vertexes projected and transformed by the camera form a triangular tile (i.e., a fragment) according to the triangular relationship between the environmental vertexes. All triangular tiles are traversed. The triangular tiles are shaded according to the environmental light. For example, interpolation can be performed according to the color of the environmental vertexes. It should be noted that the embodiment of the present disclosure does not specifically limit the fragment shading manner. For example, the color of the triangular tile may be calculated according to the environmental light and the normal direction of the triangular tile so that a finer rendering effect is obtained.

The depth buffer process may also be performed in the rasterization stage. According to the coordinate of the environmental vertex and the camera position, the Euclidean distance from the environmental vertex to the plane where a camera optical center is located is determined. As the depth of the environmental vertex, the depth of the environmental vertex may be consistent with the depth of the triangular tile to which the environmental vertex belongs. The CG rendering engine can determine the front-to-back occlusion relationship between different triangular tiles according to the depth of each triangular tile and output the image of the environmental object as the rendering result of the environmental object per fragment according to the front-to-back occlusion relationship between different triangular tiles.

In an optional embodiment, the neural radiance field of the target object is determined as follows: acquiring, in the acquisition perspective, data of the target object to obtain a two-dimensional image of the target object and a three-dimensional point cloud of the target object; fusing the two-dimensional image of the target object and the three-dimensional point cloud of the target object to obtain a fused image of the target object; and determining the neural radiance field of the target object according to the fused image of the target object and the acquisition perspective.

In this solution, a camera may be used for acquiring data of the target object in the acquisition perspective to obtain the two-dimensional image of the target object, and a laser radar may be used for acquiring the data of the target object in the acquisition perspective to obtain the three-dimensional point cloud of the target object. The two-dimensional image of the target object and the three-dimensional point cloud of the target object are fused to obtain the fused image of the target object so that the fused image can have both texture information of the two-dimensional image and depth information and geometric information of the point cloud data. The color in the fused image of the target object may be used as a network truth value for training the neural radiance field of the target object. The fused image of the target object and the corresponding acquisition perspective are used for training the neural radiance field of the target object so that the quality of the neural radiance field can be improved. It should be noted that the camera can shoot around the center of the visual field at different heights so that the fused image of the target object covers a wider perspective, and try not to be rotated when acquiring so that the subsequent algorithm can better predict the posture of the camera. When the camera must be rotated, the camera is rotated slowly and moved back and forth so that the coincidence rate of the visual field between adjacent frames is increased. Moreover, an optimization algorithm of the neural radiance field can improve the rendering accuracy, and an acceleration technique of the neural rendering, such as an instant neural graphics primitives (Instant-NGP) technique, can be used for greatly reducing the training time and the prediction time of the neural radiance field.

FIG. 2 is a flowchart of another image rendering method according to an embodiment of the present disclosure. This embodiment performs a light adjustment optimization on the image of the target object based on the preceding embodiment. Referring to FIG. 2, the image rendering method in this embodiment may include the steps below.

In step S201, a model of an environmental object is rendered to obtain an image of the environmental object in a target perspective.

In step S202, an image of a target object in the target perspective and a model of the target object are determined according to a neural radiance field of a target object.

In step S203, a normal direction of a target vertex in the model of the target object is determined according to the model of the target object.

In step S204, a light adjustment is performed on the image of the target object to obtain a light-adjusted image of the target object according to the target perspective, environmental light, and the normal direction of the target vertex.

In step S205, the light-adjusted image of the target object is fused and rendered into the image of the environmental object.

The environmental light is the environmental light of the environmental object and is provided by the environmental map and the light source of the CG rendering engine. Exemplarily, the normal direction of the target vertex can be transformed according to the target perspective so that the transformed normal direction of the target vertex is obtained. In this manner, the transformed normal direction of the target vertex and the perspective of the environmental object are consistent and are in the target perspective. Moreover, the light adjustment is performed on the image of the target object according to the environmental light and the transformed normal direction of the target vertex. The light-adjusted image of the target object is fused and rendered into the image of the environmental object so that the fused and rendered image is obtained. The light adjustment is performed on the image of the target object so that the light-adjusted image of the target object is also under the action of the environmental light. That is, the image of the environmental object and the light-adjusted image of the target object are under the same environmental light, thereby improving the light consistency between the image of the environmental object and the light-adjusted image of the target object.

In an optional embodiment, the step in which the light adjustment is performed on the image of the target object to obtain the light-adjusted image of the target object according to the target perspective, the environmental light, and the normal direction of the target vertex includes: transforming the normal direction of the target vertex by using a model view matrix in the target perspective to obtain a transformed normal direction of the target vertex; determining an intensity of the target vertex according to the environmental light and the transformed normal direction of the target vertex; and performing the light adjustment on the image of the target object to obtain the light-adjusted image of the target object according to the intensity of the target vertex.

The model view matrix in the target perspective may be obtained by performing an inverse transformation on a view matrix in the target perspective and multiplying a model matrix. The model matrix is a transformation matrix from a model coordinate system to a world coordinate system. The view matrix in the target perspective is a transformation matrix from the world coordinate system to a camera coordinate system in the target perspective. In this manner, the camera coordinate system in the target perspective can be moved to the origin of the world coordinate system by the inverse transformation of the view matrix.

Exemplarily, the normal direction of the target vertex pre-multiplies the model view matrix in the target perspective so that the transformed normal direction of the target vertex is obtained. Moreover, the environmental light is applied to the transformed normal direction of the target vertex so that the intensity of the target vertex under the action of the environmental light is obtained. For example, the environmental light direction multiplies the transformed normal direction of the target vertex so that the intensity of the target vertex is obtained. The intensity of the target vertex is used for performing the light adjustment on the image of the target object so that the light-adjusted image of the target object is obtained. Exemplarily, the intensity of the target vertex multiplies a pixel value of the target vertex in the image of the target object so that the light-adjusted image of the target object is obtained. The light-adjusted image of the target object and the environmental object are controlled to be in the same environmental light, improving the rendering consistency between the image of the target object and the image of the environmental object.

In the solutions provided by the embodiment of the present disclosure, the normal direction of the target vertex is transformed to the target perspective, and the light adjustment is performed on the image of the target object according to the environmental light and the transformed normal direction of the target vertex so that the adjusted image of the target object and the image of the environmental object are in the same environmental light, improving the rendering consistency between the image of the target object and the image of the environmental object, thereby improving the rendering quality of the fused and rendered image.

In an optional embodiment, the step in which the model of the target object and the image of the target object in the target perspective are determined according to the neural radiance field of the target object includes: acquiring a point cloud model of the target object from the neural radiance field of the target object, and processing the point cloud model of the target object to obtain a mesh model of the target object; and determining the image of the target object in the target perspective by using the camera projection matrix and the model view matrix in the target perspective according to the neural radiance field of the target object.

The point cloud model of the target object may be output from the neural radiance field of the target object and processed so that the mesh model of the target object is obtained. Optionally, according to a marching cube algorithm, the point cloud model of the target object is processed to obtain the mesh model of the target object as the three-dimensional model of the target object. The mesh model of the target object is composed of mesh vertexes and mesh tiles. The mesh model data includes vertex coordinates of the mesh vertexes and a tile relationship of the mesh tiles. Specifically, a signed distance field of voxel coordinates in a three-dimensional voxel space may be determined according to the vertex coordinates in the point cloud model of the target object. According to the marching cube algorithm, a mesh model of the target object is extracted according to the signed distance field of the voxel coordinates. The mesh model of the target object is determined according to the point cloud model of the target object, facilitating the subsequent processing of the mesh model. Correspondingly, the step in which the normal direction of the target vertex in the model of the target object is determined according to the model of the target object may include: calculating an outer product of two sides of a triangle to which the target vertex in the mesh model of the target object belongs to obtain the normal direction of the target vertex. In addition, it should be noted that the neural radiance field of the target object may also output the normal direction of the target vertex.

The camera projection matrix in the target perspective is used for projecting the target object onto the imaging plane of the camera, making the target object conform to the human visual characteristic of foreshortening effects. The camera projection matrix is determined according to the view frustum space in the target perspective, i.e., determined according to the upper plane, the lower plane, the left plane, the right plane, the far plane, and the near plane of the view frustum space. Specifically, the camera projection matrix and the model view matrix in the target perspective are input to the neural radiance field of the target object so that the image of the target object in the target perspective, i.e., a rendering image of the target object in the target perspective, is obtained by the neural rendering. The point cloud model of the target object is processed to obtain the mesh model of the target object as the three-dimensional model of the target object, not only simplifying the number of target vertexes in the model of the target object, and reducing the subsequent calculation amount of the model of the target object, but also improving the accuracy of the model of the target object. Moreover, the normal direction of the target vertex is determined by using the model of the target object so that the accuracy of the normal direction of the target vertex can also be improved. The image of the target object is obtained by using the camera projection matrix and the model view matrix in the target perspective so that the image of the target object and the image of the environmental object can be both in the target perspective, and the perspective consistency of the image of the target object and the image of the environmental object can be maintained.

FIG. 3A is a flowchart of another image rendering method according to an embodiment of the present disclosure. This embodiment is an optional solution provided based on the preceding embodiments. Referring to FIG. 3A, the image rendering method in this embodiment may include the steps below.

In step S301, a model of an environmental object is rendered to obtain an image of the environmental object in a target perspective.

In step S302, an image of a target object in the target perspective and an image of the target object are determined according to a neural radiance field of a target object.

In step S303, depth information of a target vertex in the model of the target object is determined according to the target perspective and the model of the target object.

In step S304, an occlusion relationship between the target object and an environmental object is determined according to the depth information of the target vertex.

In step S305, the image of the target object is fused and rendered into the image of the environmental object according to the occlusion relationship.

The depth information of the target vertex in the model of the target object is the Euclidean distance from the target vertex to the imaging plane of the camera. Exemplarily, the projection transformation may be performed on the model of the target object by using the camera projection matrix in the target perspective so that the distance of the target vertex in a z-axis direction is used as the depth information of the target vertex. In addition, the depth information of the target vertex may be rewritten to a depth buffer per pixel. The CG rendering pipeline compares the depth information of the target vertex with the depth information of the environmental object having been stored in this pixel, and the occlusion relationship of the target vertex is determined according to the comparison result.

Optionally, the step in which the occlusion relationship between the target object and the environmental object is determined according to the depth information of the target vertex includes: comparing depth information of a respective target vertex at each pixel in the model of the target object with depth information of a respective environmental object at the each pixel; and in response to determining that the depth information of the target vertex is smaller than the depth information of the environmental object, not occluding the target vertex.

For each pixel, if the depth information of the respective target vertex at the each pixel is smaller than the depth information of the respective environmental object, the target vertex is not occluded by the respective environmental object, and a pixel value of the environmental object is replaced by the pixel value of the target vertex. Otherwise, the target vertex at this pixel is occluded by the respective environmental object, and the pixel value of the target vertex is discarded. The depth information of the target vertex in the model of the target object is determined, the occlusion relationship between the target vertex and the environmental object is determined according to the depth information of the target vertex, and a per-pixel rewriting is performed according to the occlusion relationship so that an overall rendering result of the target object and the environmental object is obtained. In this manner, the occlusion relationship between the target object and the environmental object can be accurately reflected, thereby improving the fusing and rendering quality.

In an optional embodiment, the step in which the depth information of the target vertex in the model of the target object is determined according to the target perspective and the model of the target object includes: transforming the model of the target object by using a model view matrix in the target perspective to obtain a transformed model of the target object; and projecting the transformed model of the target object by using a camera projection matrix in the target perspective to obtain the depth information of the target vertex in the model of the target object.

The model view matrix in the target perspective may be obtained by performing an inverse transformation on a view matrix in the target perspective and multiplying a model matrix. The camera projection matrix in the target perspective is used for projecting the target object onto the imaging plane of the camera. Specifically, the coordinate of the target vertex in the model of the target object pre-multiplies the model view matrix in the target perspective so that the model of the target object in the target perspective is obtained. The perspective projection transformation is performed on the model of the target object by using the camera projection matrix in the target perspective so that the depth information of the target vertex in the model of the target object is obtained. The model of the target object is transformed to the target perspective by the model transformation, and the depth information of the target vertex is determined according to the model of the target object in the target perspective so that the accuracy of the depth information can be improved, and the accuracy of the overall rendering result can be improved.

It should be noted that in the embodiment of the present disclosure, not only the light adjustment is performed on the image of the target object, and the occlusion relationship between the light-adjusted image of the target object and the image of the environmental object according to the model of the target object, but also the depth rewriting and the pixel rewriting are performed according to the occlusion relationship so that the fused and rendered image including the image of the target object and the image of the environmental object is obtained. That is, the image of the target object and the image of the environmental object in the fused and rendered image are not only in the same environmental light, but also accurately reflect the occlusion relationship between the image of the target object and the image of the environmental object.

Figure 3B:
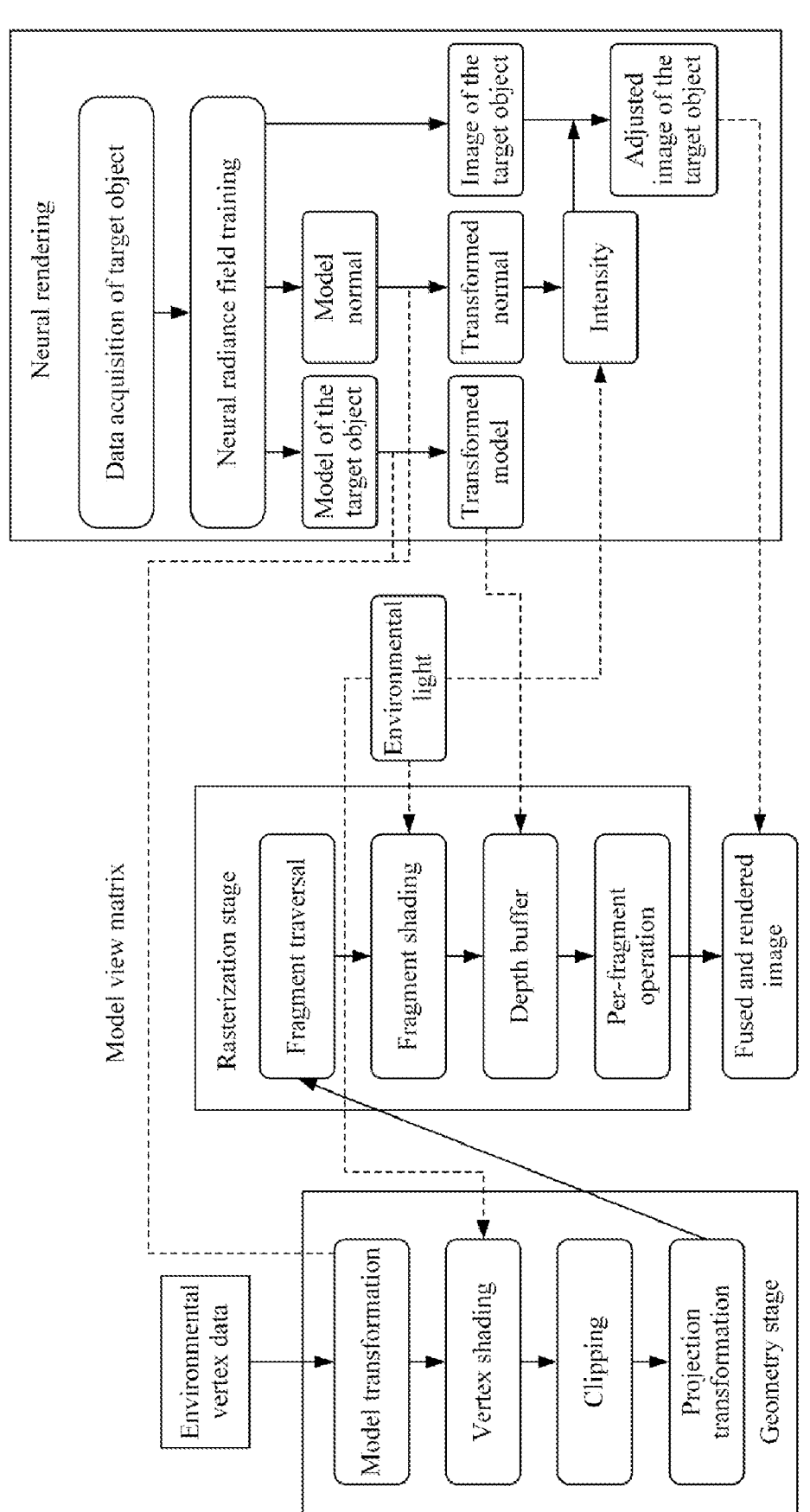
FIG. 3B is a schematic diagram of fusing and rendering a neural rendering and a CG rendering pipeline according to an embodiment of the present disclosure.

Referring to FIG. 3B, the CG rendering pipeline performs the model transformation on the environmental vertex data in the model of the environmental object by using the model view matrix in the target perspective, performs the vertex shading on the environmental vertex by using the environment light, clips the environmental vertex outside the view frustum space in the target perspective, and performs the perspective projection transformation on the shaded and clipped environmental vertex by using the camera projection matrix in the target perspective. Moreover, in the rasterization stage, the fragments in the model of the environmental object are traversed, the fragment shading is performed according to the environmental light, the visibility of the environmental vertex is determined by the depth buffer, and the per-fragment operation is performed so that the image of the environmental object is output.

Referring to FIG. 3B, a neural radiance field training is performed on the acquired image of the target object and the acquired posture of the target object according to the spatial position of the target object so that the neural radiance field of the target object is obtained. The model view matrix and the camera projection matrix in the target perspective are input into the neural radiance field so that the image of the target object in the target perspective is obtained. According to the neural radiance field, the model of the target object and the normal direction of the target vertex in the model of the target object are also determined.

The model of the target object and the normal direction of the target vertex are transformed to the target perspective by using the model view matrix in the target perspective so that the transformed model of the target object and the transformed normal direction of the target vertex are obtained. The environmental light of the CG rendering pipeline is applied to the normal direction of the transformed target vertex so that the intensity of the target vertex is obtained. The intensity of the target vertex multiplies the image of the target object so that the light-adjusted image of the target object is obtained. The camera projection matrix in the target perspective is used for performing the perspective projection transformation on the transformed model of the target object so that the depth information of the target vertex is obtained. The depth rewriting is performed according to the depth information of the target vertex. The occlusion relationship between the target vertex and the environmental object is obtained by a per-pixel depth rewriting, and the per-pixel rewriting is performed on the light-adjusted image of the target object according to the occlusion relationship so that the fused and rendered image including the environmental object and the target object is obtained.

In the solutions provided by the embodiment of the present disclosure, according to the model of the target object, the light adjustment is performed on the image of the target object output by a neural rendering field, and the occlusion relationship between the target vertex and the environmental object is determined. According to the light adjustment result and the occlusion relationship, the fused and rendered image of the target object and the environmental object is obtained. In this manner, the neural rendering technology is creatively introduced into the CG rendering pipeline, making the neural rendering result seamlessly connected to the CG rendering pipeline, and obtaining a better fusing and rendering result. That is, a new rendering enhancement technology path that combines the neural rendering and the CG rendering pipeline is proposed for injecting new vitality into the traditional production line for special effects.

Figure 4:
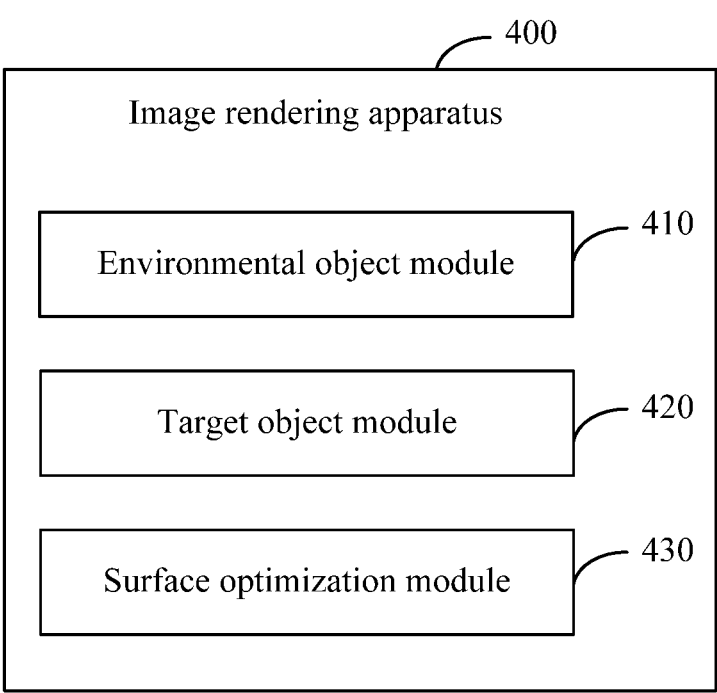
FIG. 4 is a structure diagram of an image rendering apparatus according to an embodiment of the present disclosure.

FIG. 4 is a structure diagram of an image rendering apparatus according to an embodiment of the present disclosure. This embodiment is applicable to the case where a neural rendering result is applied to a CG rendering pipeline. The apparatus may be implemented by software and/or hardware and may be integrated into an equipment carrying a user terminal. As shown in FIG. 4, the image rendering apparatus 400 in this embodiment may include an environmental object module 410, a target object module 420, and a fusing and rendering module 430.

The environmental object module 410 is configured to render a model of an environmental object to obtain an image of the environmental object in a target perspective.

The target object module 420 is configured to determine an image of a target object in the target perspective and a model of the target object according to a neural radiance field of a target object.

The fusing and rendering module 430 is configured to fuse and render the image of the target object into the image of the environmental object according to the model of the target object.

In an optional embodiment, the fusing and rendering module 430 includes a target normal unit, a light adjustment unit, and a light rendering unit.

The target normal unit is configured to determine a normal direction of a target vertex in the model of the target object according to the model of the target object.

The light adjustment unit is configured to perform a light adjustment on the image of the target object to obtain a light-adjusted image of the target object according to the target perspective, environmental light, and the normal direction of the target vertex The light rendering unit is configured to fuse and render the light-adjusted image of the target object into the image of the environmental object.

In an optional embodiment, the light adjustment unit includes a normal transformation subunit, a shading-degree subunit, and a light adjustment subunit.

The normal transformation subunit is configured to transform the normal direction of the target vertex by using a model view matrix in the target perspective to obtain a transformed normal direction of the target vertex.

The shading-degree subunit is configured to determine an intensity of the target vertex according to the environmental light and the transformed normal direction of the target vertex.

The light adjustment subunit is configured to perform the light adjustment on the image of the target object to obtain the light-adjusted image of the target object according to the intensity of the target vertex In an optional embodiment, the fusing and rendering module 430 includes a depth information unit, an occlusion relationship unit, and an occlusion rendering unit.

The depth information unit is configured to determine depth information of a target vertex in the model of the target object according to the target perspective and the model of the target object.

The occlusion relationship unit is configured to determine an occlusion relationship between the target object and an environmental object according to the depth information of the target vertex.

The occlusion rendering unit is configured to fuse and render the image of the target object into the image of the environmental object according to the occlusion relationship.

In an optional embodiment, the depth information unit includes a model transformation subunit and a depth information subunit.

The model transformation subunit is configured to transform the model of the target object by using a model view matrix in the target perspective to obtain a transformed model of the target object.

The depth information subunit is configured to project the transformed model of the target object by using a camera projection matrix in the target perspective to obtain the depth information of the target vertex in the model of the target object.

In an optional embodiment, the occlusion relationship unit includes a depth comparison subunit and an occlusion relationship subunit.

The depth comparison subunit is configured to compare depth information of a respective target vertex at each pixel with depth information of a respective environmental object at the each pixel.

The occlusion relationship subunit is configured to not occlude the respective target vertex in response to determining that the depth information of the respective target vertex is smaller than the depth information of the respective environmental object.

In an optional embodiment, the target object module 420 includes a target model unit and a target image unit.

The target model unit is configured to acquire a point cloud model of the target object from the neural radiance field of the target object, and process the point cloud model of the target object to obtain a mesh model of the target object.

The target image unit is configured to determine the image of the target object in the target perspective by using the camera projection matrix and the model view matrix in the target perspective according to the neural radiance field of the target object.

In an optional embodiment, the target model unit is specifically configured to: process the point cloud model of the target object according to a marching cubes algorithm to obtain the mesh model of the target object.

In an optional embodiment, the image rendering apparatus 400 includes a radiance field determination module. The radiance field determination module includes a data acquisition unit, a data fusion unit, and a radiance field determination unit.

The data acquisition unit is configured to acquire, in an acquisition perspective, data of the target object to obtain a two-dimensional image of the target object and a three-dimensional point cloud of the target object.

The data fusion unit is configured to fuse the two-dimensional image of the target object and the three-dimensional point cloud of the target object to obtain a fused image of the target object.

The radiance field determination unit is configured to determine the neural radiance field of the target object according to the fused image of the target object and the acquisition perspective.

In the solutions provided by the embodiment of the present disclosure, the model of the target object is determined according to a neural rendering field. According to the model of the target object, the light adjustment is performed on the image of the target object output by the neural rendering field, and the occlusion relationship between the target vertex and the environmental object is determined. According to the light adjustment result and the occlusion relationship, the fused and rendered image of the target object and the environmental object is obtained. In this manner, a new rendering enhancement technology path that combines the neural rendering and the CG rendering pipeline is creatively proposed, the powerful neural rendering technology is converted into direct productivity, and new vitality can be injected into the traditional production line for special effects.

Operations, including acquisition, storage, and application, on a user's personal information involved in the technical solution of the present disclosure conform to relevant laws and regulations and do not violate the public policy doctrine.

According to an embodiment of the present disclosure, the present disclosure also provides an electronic device, a readable storage medium, and a computer program product.

Figure 5:
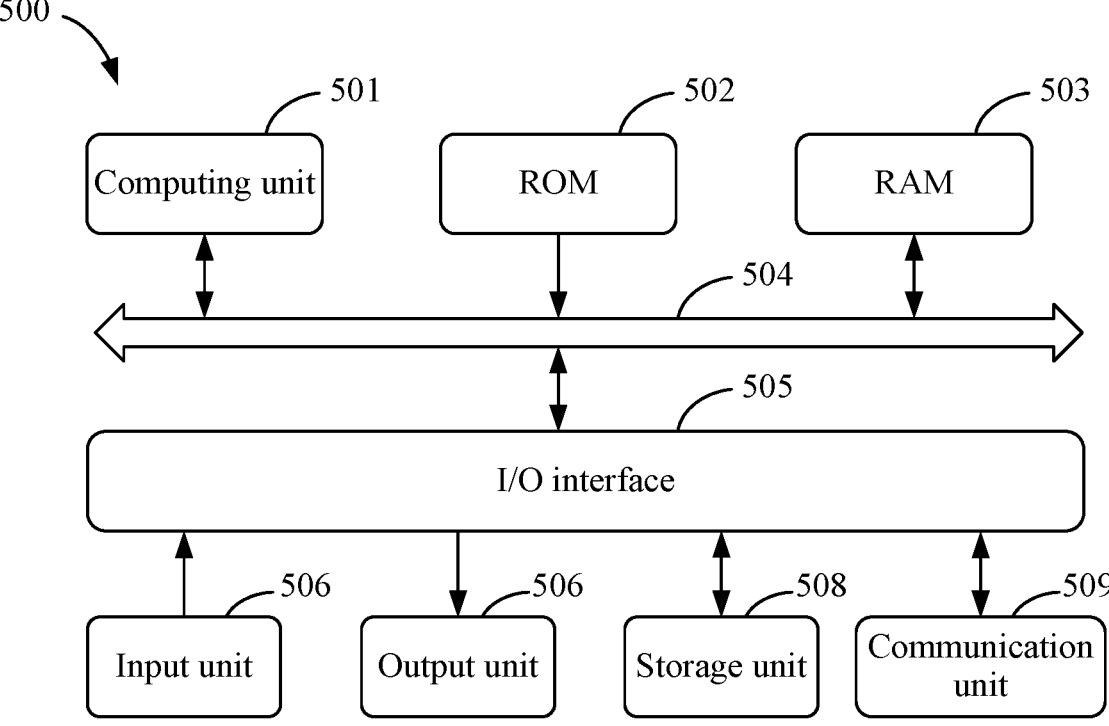
FIG. 5 is a block diagram of an electronic device for implementing an image rendering method in an embodiment of the present disclosure.

FIG. 5 is a block diagram of an electronic device for implementing an image rendering method in an embodiment of the present disclosure. FIG. 5 is a block diagram of an example electronic device 500 for implementing the embodiment of the present disclosure. The electronic device is intended to represent various forms of digital computers, for example, a laptop computer, a desktop computer, a workbench, a personal digital assistant, a server, a blade server, a mainframe computer, or another applicable computer. The electronic device may also represent various forms of mobile apparatuses, for example, a personal digital assistant, a cellphone, a smartphone, a wearable device, or a similar computing apparatus. Herein the shown components, the connections and relationships between these components, and the functions of these components are illustrative only and are not intended to limit the implementation of the present disclosure as described and/or claimed herein.

As shown in FIG. 5, the electronic device 500 includes a computing unit 501. The computing unit 501 may perform various types of appropriate operations and processing based on a computer program stored in a read-only memory (ROM) 502 or a computer program loaded from a storage unit 508 to a random-access memory (RAM) 503. Various programs and data required for the operation of the electronic device 500 are also stored in the RAM 503. The computing unit 501, the ROM 502 and the RAM 503 are connected to each other through a bus 504. An input/output (I/O) interface 505 is also connected to the bus 504.

Multiple components in the electronic device 500 are connected to the I/O interface 505. The multiple components include an input unit 506 such as a keyboard or a mouse, an output unit 507 such as various types of displays or speakers, the storage unit 508 such as a magnetic disk or an optical disk, and a communication unit 509 such as a network card, a modem, or a wireless communication transceiver. The communication unit 509 allows the electronic device 500 to exchange information/data with other devices over a computer network such as the Internet and/or various telecommunications networks.

The computing unit 501 may be a general-purpose and/or special-purpose processing component having processing and computing capabilities. Examples of the computing unit 501 include, but are not limited to, a central processing unit (CPU), a graphics processing unit (GPU), a special-purpose artificial intelligence (AI) computing chip, a computing unit executing machine learning model algorithms, a digital signal processor (DSP), and any appropriate processor, controller, and microcontroller. The computing unit 501 performs various methods and processing described above, such as the image rendering method. For example, in some embodiments, the image rendering method may be implemented as computer software programs tangibly contained in a machine-readable medium such as the storage unit 508.

In some embodiments, part or all of computer programs may be loaded and/or installed onto the electronic device 500 via the ROM 502 and/or the communication unit 509. When the computer program is loaded to the RAM 503 and executed by the computing unit 501, one or more steps of the image rendering method described above may be performed. Alternatively, in other embodiments, the computing unit 501 may be configured, in any other suitable manner (for example, by firmware), to perform the image rendering method.

Herein various embodiments of the preceding systems and techniques may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software, and/or combinations thereof. The various embodiments may include implementations in one or more computer programs. The one or more computer programs are executable and/or interpretable on a programmable system including at least one programmable processor. The programmable processor may be a dedicated or general-purpose programmable processor for receiving data and instructions from a memory system, at least one input device and at least one output device and transmitting the data and instructions to the memory system, the at least one input device and the at least one output device.

Program codes for implementation of the methods of the present disclosure may be written in one programming language or any combination of multiple programming languages. These program codes may be provided for the processor or controller of a general-purpose computer, a special-purpose computer, or another programmable data processing device to enable functions/operations specified in a flowchart and/or a block diagram to be implemented when the program codes are executed by the processor or controller. The program codes may be executed entirely on a machine, partly on a machine, as a stand-alone software package, partly on a machine and partly on a remote machine, or entirely on a remote machine or a server.

In the context of the present disclosure, the machine-readable medium may be a tangible medium that may include or store a program that is used by or in conjunction with a system, apparatus, or device that executes instructions. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. Concrete examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof.

In order that interaction with a user is provided, the systems and techniques described herein may be implemented on a computer. The computer has a display device (for example, a cathode-ray tube (CRT) or a liquid-crystal display (LCD) monitor) for displaying information to the user; and a keyboard and a pointing device (for example, a mouse or a trackball) through which the user can provide input for the computer. Other types of devices may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware or front-end components. Components of a system may be interconnected by any form or medium of digital data communication (for example, a communication network). Examples of the communication network include a local area network (LAN), a wide area network (WAN), and the Internet.

The computing system may include clients and servers. The clients and the servers are usually far away from each other and generally interact through the communication network. The relationship between the client and the server arises by virtue of computer programs running on respective computers and having a client-server relationship to each other. The server may be a cloud server, a server of a distributed system, or a server combined with a blockchain.

Artificial intelligence is the study of making computers simulate certain human thinking processes and intelligent behaviors (such as learning, reasoning, thinking, and planning) both at the hardware and software levels. Artificial intelligence hardware technologies generally include technologies such as sensors, special-purpose artificial intelligence chips, cloud computing, distributed storage, and big data processing. Artificial intelligence software technologies mainly include several major technologies such as computer vision technologies, speech recognition technologies, natural language processing technologies, machine learning/deep learning technologies, big data processing technologies, and knowledge mapping technologies.

Cloud computing refers to a technical system that accesses a shared elastic-and-scalable physical or virtual resource pool through a network, where resources may include servers, operating systems, networks, software, applications, and storage devices and may be deployed and managed in an on-demand, self-service manner. Cloud computing can provide efficient and powerful data processing capabilities for artificial intelligence, the blockchain, and other technical applications and model training.

It is to be understood that various forms of the preceding flows may be used, with steps reordered, added, or removed. For example, the steps described in the present disclosure may be executed in parallel, in sequence, or in a different order as long as the desired results of the technical solutions disclosed in the present disclosure is achieved. The execution sequence of these steps is not limited herein.

The scope of the present disclosure is not limited to the preceding embodiments. It is to be understood by those skilled in the art that various modifications, combinations, sub-combinations, and substitutions may be made depending on design requirements and other factors. Any modifications, equivalent substitutions, improvements, and the like made within the spirit and principle of the present disclosure are within the scope of the present disclosure.

16

What is claimed is:

1. An image rendering method, comprising:

rendering a model of an environmental object to obtain an image of the environmental object in a target perspective;

determining an image of a target object in the target perspective and a model of the target object according to a neural radiance field of the target object; and fusing and rendering the image of the target object into the image of the environmental object according to the model of the target object;

wherein fusing and rendering the image of the target object into the image of the environmental object according to the model of the target object comprises: determining a normal direction of a target vertex in the model of the target object according to the model of the target object; performing a light adjustment on the image of the target object to obtain a light-adjusted image of the target object according to the target perspective, environmental light, and the normal direction of the target vertex; and fusing and rendering the light-adjusted image of the target object into the image of the environmental object; or wherein fusing and rendering the image of the target object into the image of the environmental object according to the model of the target object comprises: determining depth information of a target vertex in the model of the target object according to the target perspective and the model of the target object; comparing depth information of a respective target vertex at each pixel in the model of the target object with depth information of a respective environmental object at the each pixel; in response to determining that the depth information of the respective target vertex is smaller than the depth information of the respective environmental object, determining that the respective target vertex is not occluded by the respective environmental object, and replacing a pixel value of the respective environmental object by a pixel value of the respective target vertex; and in response to determining that the depth information of the respective target vertex is greater than or equal to the depth information of the respective environmental object, determining that the respective target vertex is occluded by the respective environmental object, and discarding the pixel value of the respective target vertex;

wherein determining the image of the target object in the target perspective and the model of the target object according to the neural radiance field of the target object comprises: acquiring a point cloud model of the target object from the neural radiance field of the target object, and processing the point cloud model of the target object to obtain a mesh model of the target object; and according to the neural radiance field of the target object, determining the image of the target object in the target perspective by using a camera projection matrix and a model view matrix in the target perspective;

wherein according to the neural radiance field of the target object, determining the image of the target object in the target perspective by using the camera projection matrix and the model view matrix in the target perspective comprises: inputting the camera projection matrix and the model view matrix in the target perspective to the neural radiance field of the target object so that the image of the target object in the target perspective is obtained by a neural rendering; and wherein the neural radiance field of the target object is determined by: acquiring, in an acquisition perspective, data of the target object to obtain a two-dimensional image of the target object and a three-dimensional point cloud of the target object using a camera and a laser radar, wherein the camera shoots around a center of visual field at different heights and in a case where the camera is rotated, the camera is rotated slowly and moved back and forth to increase coincidence rate of visual field between adjacent frames; fusing the two-dimensional image of the target object and the three-dimensional point cloud of the target object to obtain a fused image of the target object; and determining the neural radiance field of the target object according to the fused image of the target object and the acquisition perspective.

2. The method according to claim 1, wherein performing the light adjustment on the image of the target object to obtain the light-adjusted image of the target object according to the target perspective, the environmental light, and the normal direction of the target vertex comprises:

transforming, by using the model view matrix in the target perspective, the normal direction of the target vertex to obtain a transformed normal direction of the target vertex;

determining an intensity of the target vertex according to the environmental light and the transformed normal direction of the target vertex; and performing the light adjustment on the image of the target object to obtain the light-adjusted image of the target object according to the intensity of the target vertex.

3. The method according to claim 1, wherein determining the depth information of the target vertex in the model of the target object according to the target perspective and the model of the target object comprises:

transforming, by using the model view matrix in the target perspective, the model of the target object to obtain a transformed model of the target object; and projecting, by using a camera projection matrix in the target perspective, the transformed model of the target object to obtain the depth information of the target vertex in the model of the target object.

4. The method according to claim 1, wherein processing the point cloud model of the target object to obtain the mesh model of the target object comprises:

according to a marching cubes algorithm, processing the point cloud model of the target object to obtain the mesh model of the target object.

5. An electronic device, comprising:

at least one processor; and a memory communicatively connected to the at least one processor, wherein the memory stores instructions executable by the at least one processor, and the instructions are executed by the at least one processor to cause the at least one processor to execute:

rendering a model of an environmental object to obtain an image of the environmental object in a target perspective;

determining an image of a target object in the target perspective and a model of the target object according to a neural radiance field of the target object; and fusing and rendering the image of the target object into the image of the environmental object according to the model of the target object;

wherein the at least one processor fuses and renders the image of the target object into the image of the environmental object according to the model of the target object by: determining a normal direction of a target vertex in the model of the target object according to the model of the target object; performing a light adjustment on the image of the target object to obtain a light-adjusted image of the target object according to the target perspective, environmental light, and the normal direction of the target vertex; and fusing and rendering the light-adjusted image of the target object into the image of the environmental object; or wherein the at least one processor fuses and renders the image of the target object into the image of the environmental object according to the model of the target object by: determining depth information of a target vertex in the model of the target object according to the target perspective and the model of the target object; comparing depth information of a respective target vertex at each pixel in the model of the target object with depth information of a respective environmental object at the each pixel; in response to determining that the depth information of the respective target vertex is smaller than the depth information of the respective environmental object, determining that the respective target vertex is not occluded by the respective environmental object, and replacing a pixel value of the respective environmental object by a pixel value of the respective target vertex; and in response to determining that the depth information of the respective target vertex is greater than or equal to the depth information of the respective environmental object, determining that the respective target vertex is occluded by the respective environmental object, and discarding the pixel value of the respective target vertex;

wherein determining the image of the target object in the target perspective and the model of the target object according to the neural radiance field of the target object comprises: acquiring a point cloud model of the target object from the neural radiance field of the target object, and processing the point cloud model of the target object to obtain a mesh model of the target object; and according to the neural radiance field of the target object, determining the image of the target object in the target perspective by using a camera projection matrix and a model view matrix in the target perspective;

wherein according to the neural radiance field of the target object, determining the image of the target object in the target perspective by using the camera projection matrix and the model view matrix in the target perspective comprises: inputting the camera projection matrix and the model view matrix in the target perspective to the neural radiance field of the target object so that the image of the target object in the target perspective is obtained by a neural rendering; and wherein the neural radiance field of the target object is determined by: acquiring, in an acquisition perspective, data of the target object to obtain a two-dimensional image of the target object and a three-dimensional point cloud of the target object using a camera and a laser radar, wherein the camera shoots around a center of visual field at different heights and in a case where the camera is rotated, the camera is rotated slowly and moved back and forth to increase coincidence rate of visual field between adjacent frames; fusing the two-dimensional image of the target object and the three-dimensional point cloud of the target object to obtain a fused image of the target object; and determining the neural radiance field of the target object according to the fused image of the target object and the acquisition perspective.

6. The electronic device according to claim 5, wherein the at least one processor performs the light adjustment on the image of the target object to obtain the light-adjusted image of the target object according to the target perspective, the environmental light, and the normal direction of the target vertex by:

transforming, by using the model view matrix in the target perspective, the normal direction of the target vertex to obtain a transformed normal direction of the target vertex;

determining an intensity of the target vertex according to the environmental light and the transformed normal direction of the target vertex; and performing the light adjustment on the image of the target object to obtain the light-adjusted image of the target object according to the intensity of the target vertex.

7. The electronic device according to claim 5, wherein the at least one processor determines the depth information of the target vertex in the model of the target object according to the target perspective and the model of the target object by:

transforming, by using the model view matrix in the target perspective, the model of the target object to obtain a transformed model of the target object; and projecting, by using a camera projection matrix in the target perspective, the transformed model of the target object to obtain the depth information of the target vertex in the model of the target object.

8. The electronic device according to claim 5, wherein the at least one processor processes the point cloud model of the target object to obtain the mesh model of the target object by:

according to a marching cubes algorithm, processing the point cloud model of the target object to obtain the mesh model of the target object.

9. A non-transitory computer-readable storage medium storing computer instructions for causing a computer to execute:

rendering a model of an environmental object to obtain an image of the environmental object in a target perspective;

determining an image of a target object in the target perspective and a model of the target object according to a neural radiance field of the target object; and fusing and rendering the image of the target object into the image of the environmental object according to the model of the target object;

wherein fusing and rendering the image of the target object into the image of the environmental object according to the model of the target object comprises: determining a normal direction of a target vertex in the model of the target object according to the model of the target object; performing a light adjustment on the image of the target object to obtain a light-adjusted image of the target object according to the target perspective, environmental light, and the normal direction of the target vertex; and fusing and rendering the light-adjusted image of the target object into the image of the environmental object; or wherein fusing and rendering the image of the target object into the image of the environmental object according to the model of the target object comprises: determining depth information of a target vertex in the model of the target object according to the target perspective and the model of the target object; comparing depth information of a respective target vertex at each pixel in the model of the target object with depth information of a respective environmental object at the each pixel; in response to determining that the depth information of the respective target vertex is smaller than the depth information of the respective environmental object, determining that the respective target vertex is not occluded by the respective environmental object, and replacing a pixel value of the respective environmental object by a pixel value of the respective target vertex; and in response to determining that the depth information of the respective target vertex is greater than or equal to the depth information of the respective environmental object, determining that the respective target vertex is occluded by the respective environmental object, and discarding the pixel value of the respective target vertex; and wherein determining the image of the target object in the target perspective and the model of the target object according to the neural radiance field of the target object comprises: acquiring a point cloud model of the target object from the neural radiance field of the target object, and processing the point cloud model of the target object to obtain a mesh model of the target object; and according to the neural radiance field of the target object, determining the image of the target object in the target perspective by using a camera projection matrix and a model view matrix in the target perspective;

wherein according to the neural radiance field of the target object, determining the image of the target object in the target perspective by using the camera projection matrix and the model view matrix in the target perspective comprises: inputting the camera projection matrix and the model view matrix in the target perspective to the neural radiance field of the target object so that the image of the target object in the target perspective is obtained by a neural rendering; and wherein the neural radiance field of the target object is determined by: acquiring, in an acquisition perspective, data of the target object to obtain a two-dimensional image of the target object and a three-dimensional point cloud of the target object using a camera and a laser radar, wherein the camera shoots around a center of visual field at different heights and in a case where the camera is rotated, the camera is rotated slowly and moved back and forth to increase coincidence rate of visual field between adjacent frames; fusing the two-dimensional image of the target object and the three-dimensional point cloud of the target object to obtain a fused image of the target object; and determining the neural radiance field of the target object according to the fused image of the target object and the acquisition perspective.

\* \* \* \* \*